356-153

CROSS REFERENCE

SEARCH ROOM

Feb. 17, 1970 W. T. REA 3,495,908

VISUAL TELEPHONE SUBSCRIBER ALIGNMENT APPARATUS

Filed Dec. 29, 1966

INVENTOR
W. T. REA DECEASED
CLARE H. REA
HIS EXECUTRIX
BY C. E. Hirsch Jr.
ATTORNEY // United States Patent Office 3,495,908

Patented Feb. 17, 1970

3,495,908

VISUAL TELEPHONE SUBSCRIBER ALIGNMENT APPARATUS

Wilton T. Rea, deceased, late of Marlboro, N.J., by Clare H. Rea, executrix, Marlboro, N.J., assignor to Bell Telephone Laboratories, Incorporated, Murray Hill and Berkeley Heights, N.J., a corporation of New York Filed Dec. 29, 1966, Ser. No. 605,931
Int. Cl. G01b *11/26;* G01n *21/02*
U.S. Cl. 356—72 7 Claims

ABSTRACT OF THE DISCLOSURE

The boundary of the field of view of a camera, or the like, is indicated usually to a person located generally in the field of view of the camera. When positioned properly within the field, the person views through a parallax screen a first distinctive pattern, and when positioned improperly, he views a second distinctive pattern, for example, a variation in the first pattern. Such apparatus is useful for indicating to a subscriber using a visual telephone set that he is properly positioned in relation to the camera associated with the set.

BACKGROUND OF THE INVENTION

Field of the invention

This invention relates to alignment apparatus, and more particularly, to aparatus for use with a visual telephone set for providing a subscriber with a visual indication that he is properly aligned with the station set camera.

In using a visual telephone set, a subscriber must align himself properly with respect to the station set camera. Otherwise, a remote subscriber is likely to view a scene that shows only a portion of that which is desired. For example, he may view only a part of the local subscriber's facial features.

Description of the prior art

Attempts have been made at solving this problem, namely, that of indicating to a subscriber that he is properly within the field of view of the camera, and several alignment devices have been proposed. For example, a "light tube" system and a system utilizing mirrors were disclosed in U.S. Patent 2,909,600, issued to F. K. Becker on Oct. 20, 1959. These devices, although acceptable functionally, are unsatisfactory in use because they tend to distract a subscriber from the scene he is viewing. Moreover, these systems are unsatisfactory in practice because they require much valuable cabinet space. Another attempt at solving this problem involves the use of a cone of light projected to circumscribe the eyes of a subscriber when he is properly aligned; hopefully, he does not see the light. When aligned improperly, the light becomes visible to him. Again, this device is functionally satisfactory. However, it is distracting to a subscriber to have a light shining at or about his eyes. Additionally, the apparatus necessary to project the cone of light requires considerable space within the cabinet. Still another possible solution to the problem uses a switch circuit that connects the camera and receiver systems associated with the station set in such a manner that a subscriber's image can be reproduced on the display device of the local station set. The subscriber can align himself from this image. As with other proposals, this system is functionally satisfactory but contains other drawbacks. For example, it employs additional complex electrical equipment. Since the scene being viewed during the alignment function is frequently interrupted, the subscriber is frequently distracted from the scene he is viewing.

Summary of the invention

It is desirable that the problem of subscriber alignment be solved by use of an alignment device that requires little room and equipment. Further, it is also desirable that alignment be achieved with a minimum of distraction of the subscriber from the scene he is viewing.

Therefore, it is the object of this invention to indicate, with maximum simplicity and minimum distraction, to one having his image reproduced by a camera, or other image sensing device, that he is properly aligned within the field of the apparatus sensing his image.

In accordance with this invention, alignment apparatus for indicating to a subscriber using a visual telephone set, or other image sensing device, that he is properly positioned within the field of the image sensor associated with the set comprises a form of parallax panoramagram. A parallax panoramagram typically employs a parallax mask to change the form of a display presented to a viewer as a function of position. Such a device employs a grating, or transparent ridge mask, such as, for example, a lenticular viewing screen, including an array of segmented cylindrical lens elements, and a pattern with at least two distinctive regions arranged for selective viewing through the screen.

Apparatus for assuring alignment in two different directions preferably comprises a first viewing mask, a first pattern disposed for viewing through the first mask, a second viewing mask, a second pattern disposed for viewing through the second mask, and means for supporting the masks and their associated patterns in juxtaposition to a visual telephone set in a position such that a subscriber aligned properly with the set's camera will view distinct patterns through the masks.

The masks, e.g., lenticular screens or gratings, and associated warning patterns are positioned with respect to the camera system such that an axis projecting from the image sensor, or lens system, of the camera, and axes projecting from the center of and normal to the front surface of the individual screens, tend to intersect at a point located at the normal viewing distance or focusing distance in front of the set. Each warning pattern is arranged to be modified by the individual lenses of the lenticular screen through which the composite pattern is viewed in such a manner that a subscriber viewing the pattern along the center axis normal to the front surface of the screen sees the pattern without warning, i.e., in one of its two forms only. If the subscriber moves to view the screen from other than the normal axis, the pattern is viewed in its other form, and the subscriber is put on notice that he is out of alignment with the camera. When properly aligned, the subscriber will see a normal distinctive pattern, for example, a particular color, in each of the lenticular screen arrangements used with the camera system, and when misaligned, he will see a change in the distinctive patterns, for example, a variation in color. Thus, the apparent change in the patterns conveys a warning to the viewer that he must realign himself with respect to the camera. Preferably, one screen and its associated pattern is employed to indicate vertical alignment with respect to the camera system, and another screen and its associated pattern is employed to indicate horizontal alignment.

These and other objects and advantages of the present invention will appear upon consideration of the various illustrative embodiments now to be described in detail in connection with the accompanying drawings.

Detailed description of the invention

Figure 1:
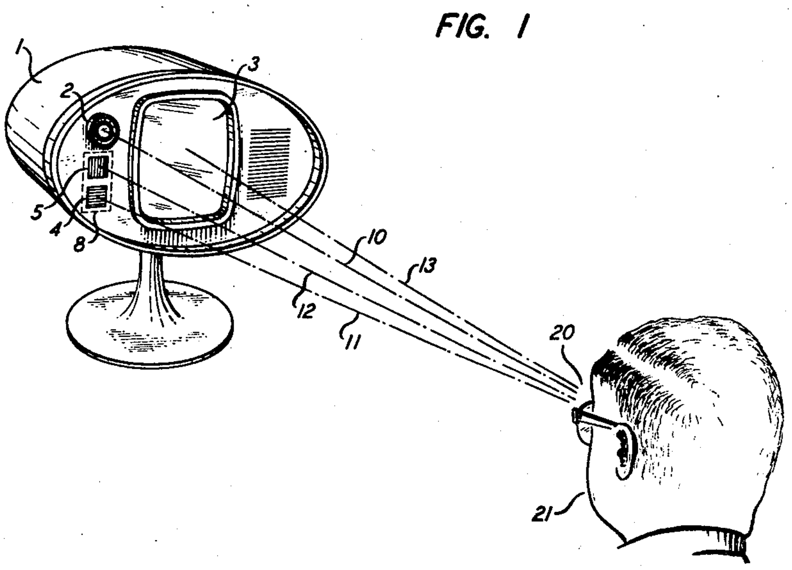
FIG. 1 is a schematic presentation of a subscriber using a visual telephone set equipped for subscriber self-alignment in accordance with the present invention.

FIG. 1 shows a subscriber 21 using a visual telephone station set 1 that incorporates alignment apparatus 8 in accordance with this invention. A camera 2, employing, for example, a vidicon pickup element, and a viewing device 3, for example, a cathode ray tube, are mounted in set 1. Alignment apparatus 8 of the present invention is mounted, for example, on the face of set 1. Apparatus 8 comprises parallax panoramagrams 4 and 5 arrayed to exhibit distinctive warning patterns when viewed from prescribed directions. In this example, units 4 and 5 are mounted below camera 2. Although this mounting arrangement is preferable, the units can be mounted in other positions. For example, both parallax units could be mounted directly over viewing device 3. Units 4 and 5 are orientated in such a manner that one of them, for example, unit 4, is positioned with its lens elements arranged horizontally. The other unit, 5, is oriented such that its lens elements are arranged vertically. With this orthogonal arrangement, both vertical and lateral deviation from proper alignment with the visual telephone set camera will be controlled. Unit 4, whose lenses are horizontally orientated, indicates vertical alignment, and unit 5, whose lenses are orientated vertically, controls lateral alignment.

Parallax units 4 and 5 are disposed in juxtaposition to camera 2 in such a manner that axes 11 and 12, normal to the front surface of the screens of units 4 and 5, respectively, and projecting from the front of set 1, tend to intersect with axis 10 projecting from the image sensor, i.e., from the lens system of camera 2, at a point 20. Point 20 is in the approximate area of the eyes of subscriber 21. Preferably, the apparatus is adjusted to bring point 20 to approximately 36 to 40 inches from the viewing screen; this being the normal subscriber viewing distance from the front of set 1. Viewing device 3 can be positioned such that an axis 13 projecting from its surface intersects axes 10, 11, and 12 at point 20. This may be desirable to allow the subscriber to view a scene and the alignment device 8 concurrently, with a minimum of distraction from the scene being viewed. For example, if a subscriber positioned approximately at point 20 views alignment apparatus 8 along axes 11 and 12, respectively, without a warning, he will be in proper alignment with camera 2 while he is viewing a scene on the viewing device 3. If the subscriber moves or drifts from point 20, he will view the lenticular screens of units 4 and 5 other than along axes 11 and 12. Due to this different viewing angle, the warning patterns associated with the screens of units 4 and 5 will be modified by the lenses of the lenticular screens and an apparent change in the patterns will appear to him, thereby warning him that he is misaligned with camera 2.

Figure 2:
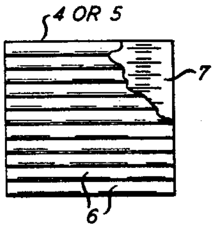
FIG. 2 is a schematic presentation of a lenticular screen constructed in accordance with the present invention.
Figure 3:
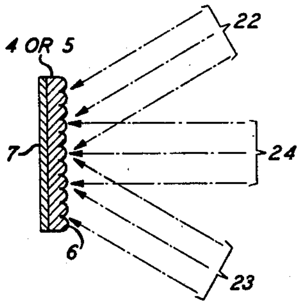
FIG. 3 is a sectional view of the lenticular screen of FIG. 2.

FIGS. 2 and 3 show a parallax unit 4 comprising an array of segmented cylindrical lens elements 6 extending in a parallel configuration. A warning pattern 7 is disposed behind the screen and is arranged to be viewed through the lens elements 6 in such a manner that the appearance of pattern 7 will be modified by the individual lens elements 6 when the screen of unit 4 is observed from different viewing angles. Typically, pattern 7 is composed of at least two alternate series of parallel image lines, e.g., alternate lines of red and green, or the like. The line pattern is optically related to the lenticular screen in a fashion well known in the art.

Thus, for example, an observer viewing the screen along an axis 24, normal to the screen, will see one of the alternate series of lines of pattern 7. Movement in a direction from axis 24, e.g., to axis 22, will cause the observer to view the screen of unit 4 from a different angle and a change in pattern 7 will be apparent to him, i.e., he will see a different series of lines of pattern 7. Likewise, movement to another axis, e.g., axis 23, will cause the observer to view another change in the pattern 7. These changes in pattern 7 will convey a warning to an observer. The particular pattern used can be one of many; for example, the normal pattern viewed from within the field of the camera may be of the same color as the background upon which the screen arrangement is supported. A distinctive color then appears when the arrangement is viewed from without the designated field of view.

The manner in which these effects are produced and the optics of this family of devices, i.e., lenticular screens or gratings, are well known in the art. For example, the construction of and a process for assembling lenticular screens and patterns to produce units suitable for use in the present invention are disclosed in U.S. Patent 2,815,310, issued to V. G. Anderson on Dec. 3, 1957.

The above-described arrangements are, of course, merely illustrative of the application of the principles of the invention. Numerous other arrangements may be devised by those skilled in the art without departing from the spirit and scope of the invention. For example, the array of lenses in the lenticular mask may be arranged in oval or circular symmetry instead of the parallel arrangement described. Moreover, several similar but individual lenticular mask arrangements may be employed. For example, individual parallax units may be positioned to surround the viewing screen aperture, or assembled as unitary structures for placement on or attachment to previously manufactured units.

What is claimed is:

1. Alignment apparatus for indicating to a subscriber using a visual telephone set that he is properly positioned in the field of view of a camera associated with said set comprising: a parallax screen, a correct positional pattern disposed for selective viewing through said screen, and means for spacing said visual telephone, said screen and associated pattern to define a visual axis such that a subscriber aligned along said axis views said correct positional pattern through said screen.

2. Alignment apparatus as defined in claim 1 wherein said parallax screen comprises a transparent lenticular mask.

3. Alignment apparatus as defined in claim 1 wherein said pattern includes at least two distinctive regions arranged for viewing through said screen, the first of said regions being visible to said subscriber along said axis projecting from the surface of said screen, and the second of said regions being otherwise visible.

4. Apparatus for indicating to a subscriber using a visual telephone set that he is properly positioned with respect to a camera associated with said set comprising:
- a first lenticular screen,
- a first warning pattern disposed for viewing through said first screen,
- a second lenticular screen,
- a second warning pattern disposed for viewing through said second screen, and
- means for spacing said visual telephone, said screens and associated patterns such that said subscriber when improperly aligned with said camera views said warning patterns through said screens.

5. Apparatus as defined in claim 4 wherein said first warning pattern is disposed for viewing through said first screen in such a manner that a first distinctive region is visible along a given axis from the front surface of said first screen and a second distinctive region is visible along axes incident to said surface of said first screen other than said given axis, and wherein said second warning pattern is disposed for viewing through said second screen in such a manner that a first distinctive region is visible along a given axis from the front surface of said second screen and a second distinctive region is visible along axes incident to said surface of said second screen other than said given axis.

6. Apparatus as defined in claim 4 wherein said first and second lenticular screens each comprise a plurality of segmented cylindrical lens elements arranged in a parallel array.

7. Apparatus as defined in claim 6 wherein said lens elements of said first and second lenticular screens are orientated orthogonally to one another.

References Cited

UNITED STATES PATENTS

| | | | |
|---|---|---|---|
| 2,420,198 | 5/1947 | Rosenthal | 178—6.8 |
| 2,909,600 | 10/1959 | Becker | 178—6.8 |
| 3,085,473 | 4/1963 | Bourgeaux et al. | 350—167 |
| 3,138,779 | 6/1964 | Murray et al. | 340—25 |
| 3,348,264 | 10/1967 | Rice et al. | |

FOREIGN PATENTS

| | | |
|---|---|---|
| 314,533 | 1931 | Great Britain. |

RONALD L. WIBERT, Primary Examiner

J. ROTHENBERG, Assistant Examiner

U.S. Cl. X.R.

178—6.8; 350—167; 356—153; 357—172